United States Patent
Wakisaka

(10) Patent No.: US 8,314,887 B2
(45) Date of Patent: Nov. 20, 2012

(54) DISPLAY DEVICE THAT DISPLAYS OPERATION GUIDE

(75) Inventor: Masako Wakisaka, Osaka (JP)

(73) Assignee: SANYO Electric Co., Ltd., Moriguchi-shi (JP)

(*) Notice: Subject to any disclaimer, the term of this patent is extended or adjusted under 35 U.S.C. 154(b) by 27 days.

(21) Appl. No.: 13/165,189

(22) Filed: Jun. 21, 2011

(65) Prior Publication Data

US 2011/0310300 A1  Dec. 22, 2011

(30) Foreign Application Priority Data

Jun. 22, 2010 (JP) ................. 2010-141415

(51) Int. Cl.
- H04N 5/445 (2006.01)
- H04N 5/50 (2006.01)
- H04N 5/268 (2006.01)

(52) U.S. Cl. .......... 348/563; 348/569; 348/706

(58) Field of Classification Search .......... 348/563, 348/564, 569, 705, 706, 725, 553, 554; 725/37, 725/40; 345/629, 619; *H04N 5/445, 5/50, 5/44, 5/268, 3/27*

See application file for complete search history.

(56) References Cited

U.S. PATENT DOCUMENTS

| | | | |
|---|---|---|---|
| 2005/0264702 A1* | 12/2005 | Yoshii | 348/554 |
| 2006/0080708 A1* | 4/2006 | Miyazawa et al. | 725/37 |

FOREIGN PATENT DOCUMENTS

JP   2001-238146 A   8/2001

* cited by examiner

*Primary Examiner* — Sherrie Hsia
(74) *Attorney, Agent, or Firm* — Westerman, Hattori, Daniels & Adrian, LLP

(57) ABSTRACT

A display device operates according to an operation mode which is currently set effective, and operates in compliance with instructions assigned to operation switches when the operation switches are operated. A guide display portion has a plurality of kinds of operation guides which correspond to patterns on a one-to-one basis, and displays any of the operation guides corresponding to any of the patterns that is currently used for assigning instructions to the operation switches.

10 Claims, 7 Drawing Sheets

DISPLAY DEVICE THAT DISPLAYS OPERATION GUIDE

This application is based on Japanese Patent Application No. 2010-141415 filed on Jun. 22, 2010, the contents of which are hereby incorporated by reference.

BACKGROUND OF THE INVENTION

1. Field of the Invention

The present invention is related to a display device such as a television broadcast receiver, and in particular, the present invention is related to a display device that displays an operation guide that indicates instructions assigned to operation switches.

2. Description of Related Art

Conventionally, various types of display devices provided with a display such as television broadcast receivers and PC (personal computer) monitors have been available. As in typical electronic apparatuses, display devices are often provided with operation switches (such as press button switches arranged on their main bodies) for accepting various instructions given by a user.

For example, in the case of a television broadcast receiver, in a normal state, a user may try to give, as necessary, various instructions such as instructions for "switching ON/OFF the power", "switching input lines", "switching (in the ascending order) channels to be received", "switching (in the descending order) channels to be received", "adjusting the sound volume (to turn it down)", and "adjusting the sound volume (to turn it up)".

Thus, television broadcast receivers are provided with operation switches to which these instructions can be assigned. This enables television broadcast receivers to accept operation performed by a user on the operation switches and to operate according to the instruction given by the user.

Some display devices have specifications such that a plurality of operation modes are prepared in advance, and that operation is performed according to an operation mode that is currently set effective. For example, as for television broadcast receivers, a number of television broadcast receivers are equipped with an operation mode (a menu mode) for performing various settings, in addition to an operation mode (a normal mode) for performing normal television broadcast receiving operation.

In the menu mode mentioned above, such television broadcast receivers accept operation performed on the operation switches to thereby accept inputs of various settings (instructions different from those given in the normal mode). Incidentally, provision of operation switches dedicated for the menu mode would result in disadvantages in terms of size and cost reduction of products. Thus, in many cases, operation switches are commonly used for various operation modes (here, for the normal mode and the menu mode). That is, in different operation modes, different instructions are assigned to each of the operation switches.

Also, for the purpose of making the operation switches user-friendly, information (an operation guide) showing what instruction is assigned to each of the operation switches may be displayed. Patent Document 1 (JP2001-238146) discloses a display device in which an operation guide is displayed on a display when a user's hand is found by a non-contact sensor to have approached the television broadcast receiver.

Displaying the operation guide on the display in this way makes it easier, in comparison with a case in which the operation guide is presented on the housing of the display device or on the operation switches themselves, to enhance the visibility of the operation guide, and to reduce the space for display to thereby realize a compact product.

As described above, in some display devices, a plurality of operation modes are prepared, and a plurality of instructions (instructions based on different patterns prepared for different operation modes) are assigned to each one of the operation switches. In this case, since instructions assigned to each operation switch are different depending on which operation mode is currently effective, it is desirable that the operation guide is displayed corresponding to the currently effective operation mode.

SUMMARY OF THE INVENTION

According to the present invention, a display device includes: a display; an operation mode setting portion which switchably sets any of a plurality of prepared operation modes to be effective; a plurality of operation switches to each of which different instructions are assigned based on patterns which are prepared corresponding to the operation modes on a one-to-one basis; and a guide display portion which displays, on the display, an operation guide indicating what instruction is assigned to each of the operation switches. Here, the display device operates according to an operation mode which is currently set effective, the display device operating in compliance with instructions assigned to the operation switches when the operation switches are operated; and the guide display portion has a plurality of kinds of operation guides which are prepared as the operation guide and which correspond to the patterns on a one-to-one basis, the guide display portion displaying any of the operation guides corresponding to any of the patterns that is currently used for assigning instructions to the operation switches.

BRIEF DESCRIPTION OF THE DRAWINGS

The objects and features of the present invention will be understood more clearly from the following descriptions of preferred embodiments and accompanying drawings that are briefly summarized below.

DETAILED DESCRIPTION OF PREFERRED EMBODIMENTS

Hereinafter, a description will be given of an embodiment of the present invention, dealing with a television broadcast receiver (a kind of display device) as an example.

[Structure of Television Broadcast Receiver, etc.]

Figure 1:
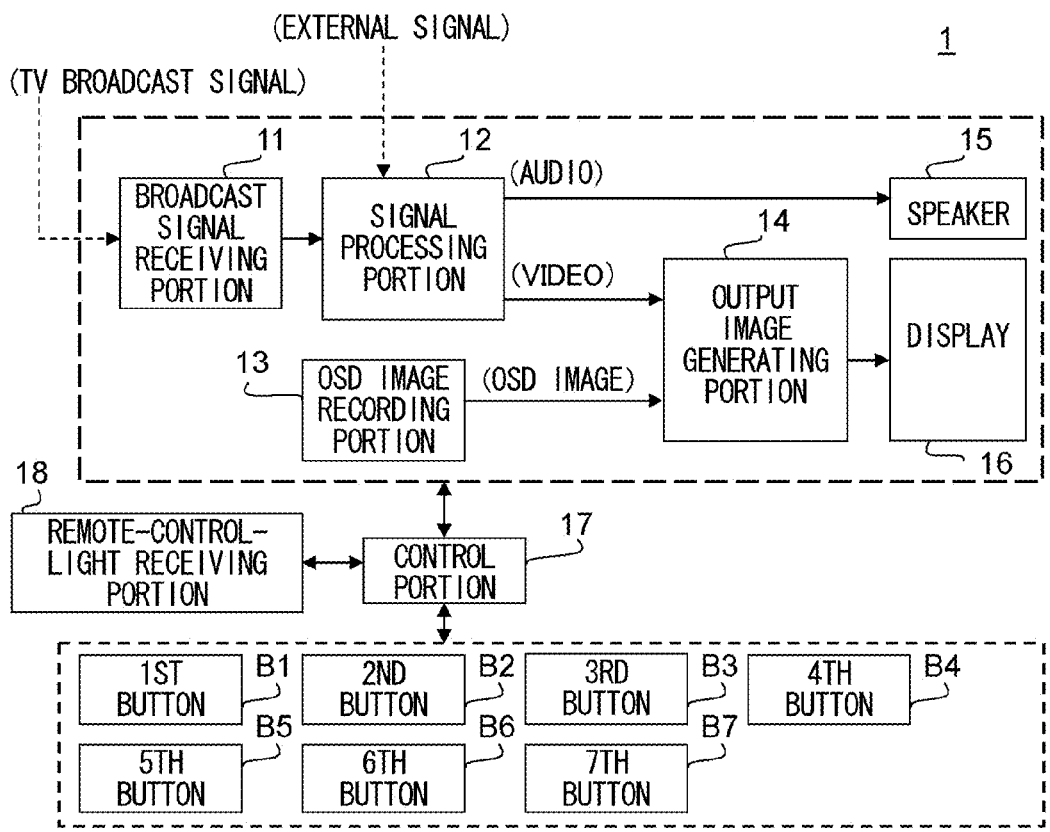
FIG. 1 is a block diagram showing the structure of a television broadcast receiver embodying the present invention.
Figure 2:
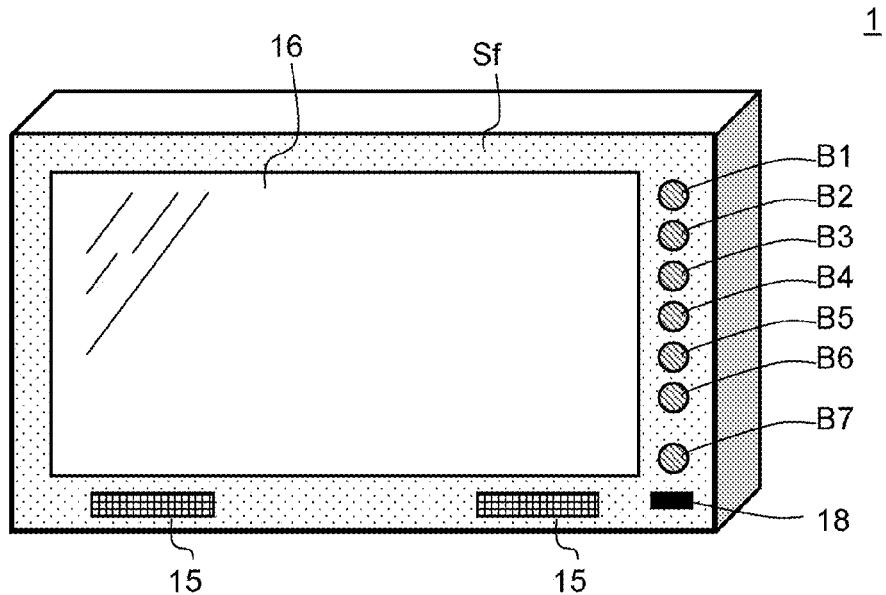
FIG. 2 is an external view of the television broadcast receiver.

FIG. 1 is a block diagram showing the structure of a television broadcast receiver embodying the present invention. FIG. 2 is an external view of the television broadcast receiver. As shown in these figures, the television broadcast receiver 1 includes a broadcast signal receiving portion 11, a signal processing portion 12, an OSD (on screen display) image recording portion 13, an output image generating portion 14, a speaker 15, a display 16, a control portion 17, a remote-control-light receiving portion 18, button switches (B1 to B7), and the like.

As shown in FIG. 2, the television broadcast receiver 1 is formed such that components are accommodated within a housing. In use, the television broadcast receiver 1 is placed such that the front surface Sf (the surface illustrated on the front side in FIG. 2) of the housing faces toward a user (a viewer).

The broadcast signal receiving portion 11, which is formed of an antenna (or a broadcast-signal input terminal), a tuner, etc., has a function of receiving television broadcast. Switching of broadcast channels selected by the tuner is controlled by the control portion 17 (that is, the control portion 17 performs the control according to instructions of "Channel +" and "Channel –" which will be described later).

The signal processing portion 12 has, as signal input lines, not only a first input line through which broadcast signals are inputted, but also a second input line through which other external signals (for example, signals containing audio and image information outputted from an externally connected recording/playing apparatus) are inputted. And, which of the input lines to be made effective is controlled by the control portion 17 (that is, the control portion 17 performs the control according to a later-described "input switching" instruction).

When the first input line is effective, the signal processing portion 12 extracts, from a received broadcast signal, an image signal (a video signal) indicating an image (video) of a television program and an audio signal indicating audio of the television program. The image and audio signals are sent to the output image generating portion 14 and the speaker 15, respectively.

On the other hand, when the second input line is effective, the signal processing portion 12 extracts an image signal (a video signal) and an audio signal from a received external signal. The image and audio signals are sent to the output image generating portion 14 and the speaker 15, respectively.

The OSD image recording portion 13 is formed of, for example, a flash memory, and has various kinds of OSD image information recorded therein, which is OSD-displayed on the display 16 as necessary. The OSD image information recorded in the OSD image recording portion 13 is sent to the output image generating portion 14 according to an instruction given by the control portion 17.

Figure 5:
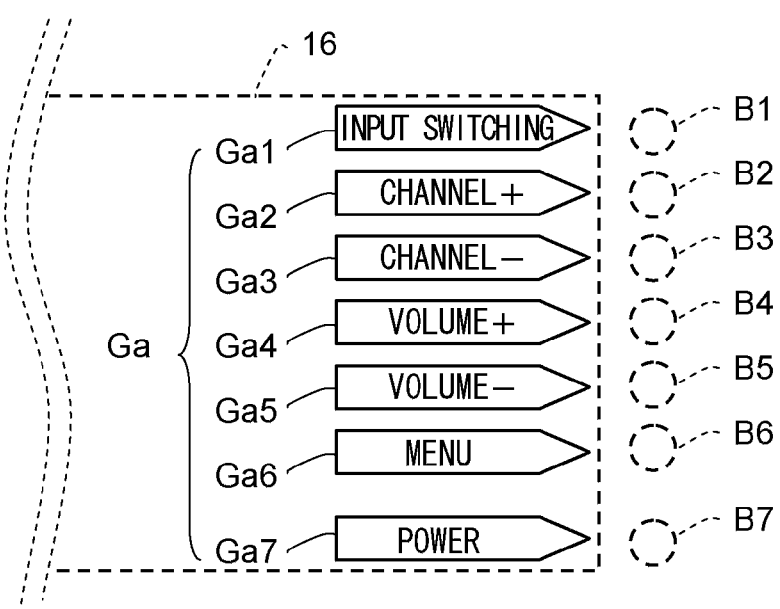
FIG. 5 is a schematic diagram illustrating the form of a first operation guide.
Figure 7:
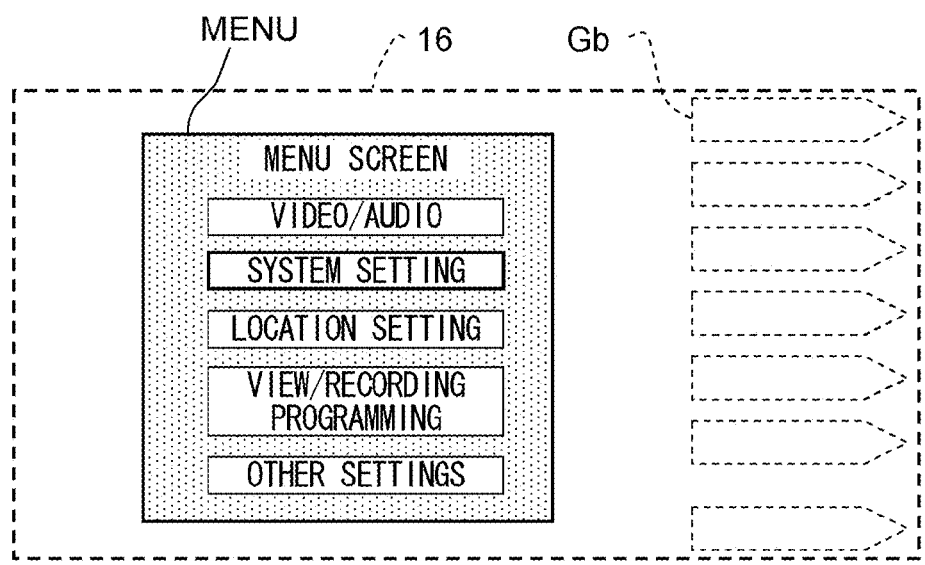
FIG. 7 is a schematic diagram illustrating the form of a menu screen.
Figure 8:
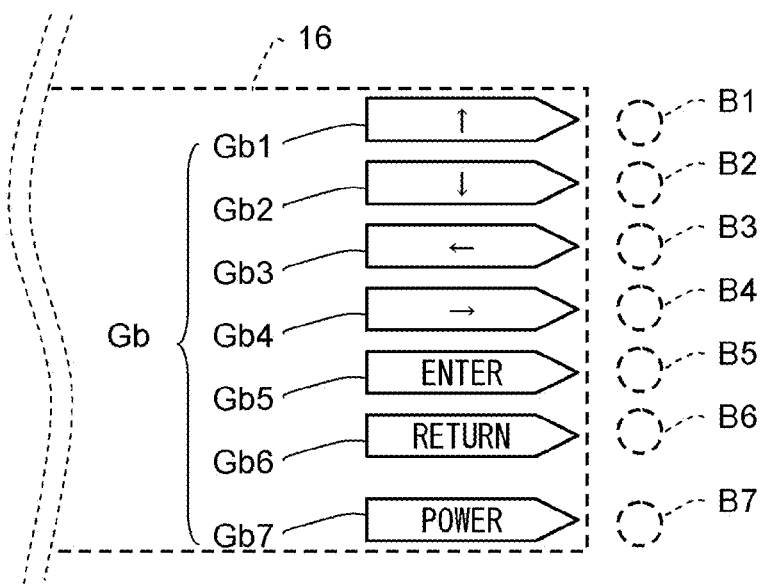
FIG. 8 is a schematic diagram illustrating the form of a second operation guide.

The main OSD image information recorded in the OSD image recording portion 13 includes, for example, first guide information Ga formed as shown in FIG. 5, a menu screen MENU formed as shown in FIG. 7, and second guide information Gb formed as shown in FIG. 8. A clear description of how these are used will be given later.

The output image generating portion 14 generates an output image signal to be displayed on the display 16, and sends the output image signal to the display 16. The output image generating portion 14 generates an output image signal based on an image signal received from the signal processing portion 12. Here, if the control portion 17 has given an instruction to display an OSD image, the output image generating portion 14 generates the output image signal such that OSD image information recorded in the OSD image recording portion 13 is OSD-displayed (that is, such that an OSD image is superimposed on the image displayed based on the image signal received from the signal processing portion 12).

The speaker 15 generates audio based on an audio signal received from the signal processing portion 12. The speaker 15 is provided on the front surface Sf of the housing as shown in FIG. 2, and thus is capable of outputting audio toward the user. The sound volume (hereinafter, volume) of the speaker 15 is controlled by the control portion 17 (that is, the control portion 17 performs the control according to instructions of "Volume +" and "Volume –" which will be described later).

The display 16 is formed, for example, as a liquid crystal display or a plasma display, and displays an image based on a received output image signal. The display 16 is provided on the front surface Sf of the housing as shown in FIG. 2, and thus is capable of displaying an image toward the user.

The control portion 17 is formed of, for example, a CPU, and controls each portion such that the television broadcast receiver 1 operates normally. As will be made clear in the later-given description, the television broadcast receiver 1 is provided with, as operation modes, a "normal mode" (an operation mode suitable for viewing television broadcast) and a "menu mode" (an operation mode provided for performing various settings), either of which is switchably set effective. That is, the television broadcast receiver 1 operates according to the operation mode that is currently set effective.

The remote-control-light receiving portion 18 receives an infrared ray as a remote control signal from an unillustrated remote control signal sending unit, and sends to the control portion the contents of the remote control indicated by the remote control signal. This enables the television broadcast receiver 1 to accept a remote-control operation. Further, as shown in FIG. 2, the remote-control-light receiving portion 18 is provided on the front surface Sf of the housing to facilitate the receiving of the remote control signal.

The button switches (a first button B1 to a seventh button B7) are each formed as a press button switch for the user to freely press (operate). Information of which one of the button switches (B1 to B7) is currently pressed is transmitted to the control portion 17. This enables the control portion 17 to reflect the user's intention in the control of each portion.

Further, as shown in FIG. 2, the button switches (B1 to B7) are each arranged on the front surface Sf of the housing along an edge of the display 16. Incidentally, the button switches (B1 to B7) are each fixedly provided on the main body of the television broadcast receiver 1, and thus, unlike the remote control signal sending unit, there is no fear of the button switches being lost.

[Operation of Television Broadcast Receiver]

Figure 3:
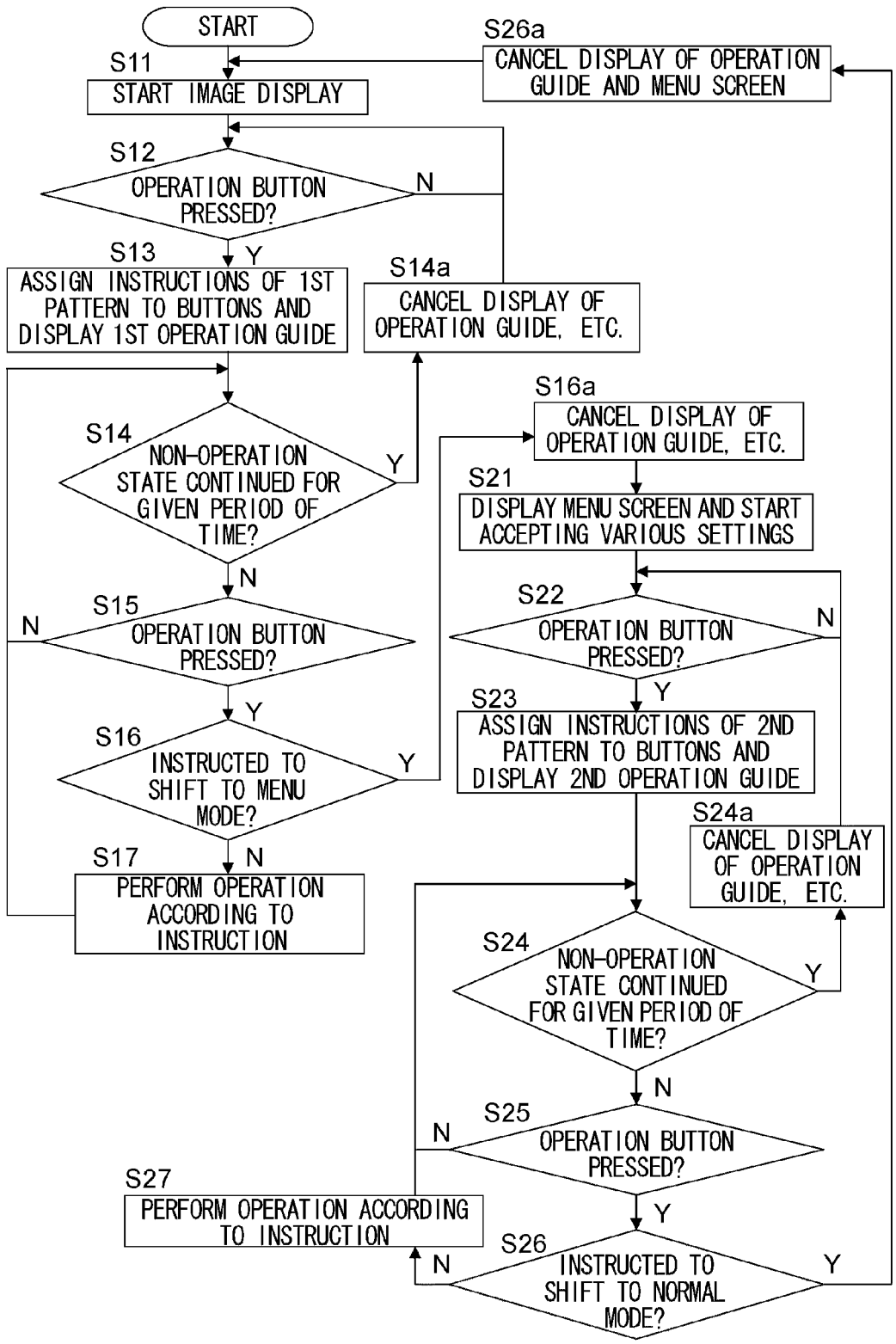
FIG. 3 is a flowchart of the main operation that the television broadcast receiver performs.

Next, a description will be given of the flow of the main operation that the television broadcast receiver 1 performs, with reference to a flow chart shown in FIG. 3.

Immediately after the power of the television broadcast receiver 1 is turned on, the operation mode of the television broadcast receiver 1 is set to the "normal mode". That is, the television broadcast receiver 1 performs operations of steps S11 to S17, which will be described below, as operations of the normal mode.

Figure 4:
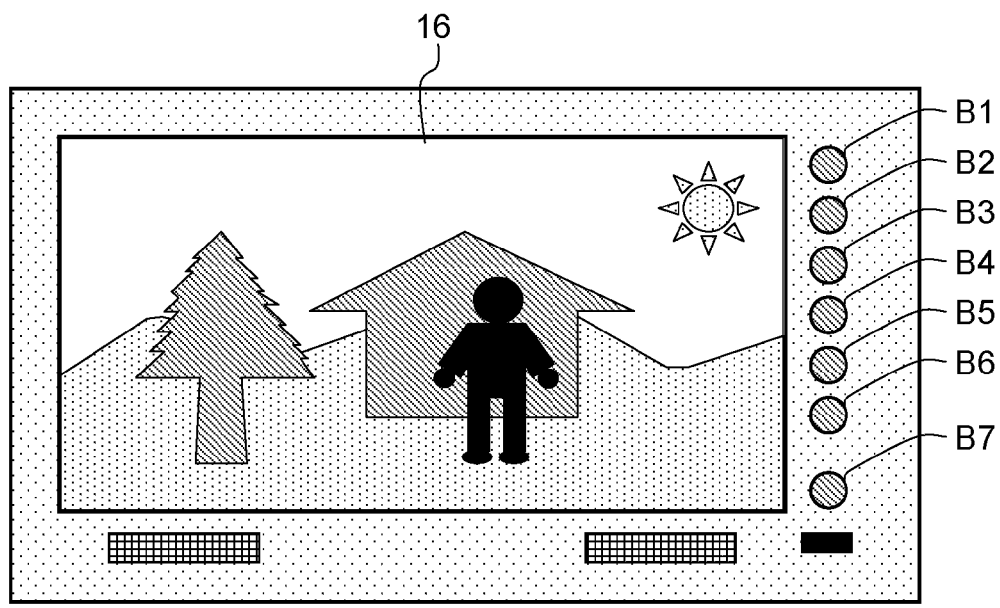
FIG. 4 is a schematic diagram illustrating a state in which an image of a TV program is full-screen displayed.

In the "normal mode", the control portion 17 appropriately controls the broadcast signal receiving portion 11, the signal processing portion 12, and the output image generating portion 14, and as shown in FIG. 4, starts operating to make the display 16 display an image of a television program (or of an external signal) (step S11). This display continues to be performed as long as the "operation mode" is set effective.

And, in a situation in which a later-described operation guide Ga is not displayed (assignment of instructions according to a later-described first pattern has not been carried out yet, either), the control portion 17 stands by to wait for any of the button switches (B1 to B7) to be pressed, which is regarded as an instruction to display a guide (step S12). And, when any of the button switches (B1 to B7) is pressed, that is, when an instruction to display a guide is given (Y in step S12), the control portion 17 assigns instructions to the button switches (B1 to B7) according to the first pattern, which is prepared in advance, and starts the OSD display of the first operation guide Ga shown in FIG. 5 (step S13).

Here, the first pattern is a pattern in which attention is paid to user-friendliness in the normal mode, and in the first pattern, instructions are assigned to the button switches (B1 to B7) in the following manner; that is, the first button B1 is for an "Input-switching" instruction (to switch the input line to be made effective), the second button B2 is for a "Channel +" instruction (to switch the channel-to-be-selected in the ascending order), the third button B3 is for a "Channel −" instruction (to switch the channel-to-be-selected in the descending order), the fourth button B4 is for a "Volume +" instruction (to turn up the volume by one level), the fifth button B5 is for a "Volume −" instruction (to turn down the volume by one level), the sixth button B6 is for a "Menu" instruction (to shift the operation mode to the menu mode), and the seventh button B7 is for a "Power" instruction (to turn off the power).

Further, as shown in FIG. 5, the first operation guide Ga is an OSD display for indicating (guiding the user to) what instruction is assigned to each of the buttons (B1 to B7) in a state in which the instructions are assigned based on the first pattern. The first operation guide Ga includes individual guides, namely, a first individual guide Ga1 to a seventh individual guide Ga7, indicating the contents of the instructions assigned to the button switches (B1 to B7), respectively.

Incidentally, an "n"th individual guide corresponds to an "n"th button and indicates the contents of the instruction assigned thereto. And, each of the individual guides (Ga1 to Ga7) is displayed along an edge of the display 16 to form a pair with a corresponding one of the button switches (B1 to B7) (in other words, displayed next to the corresponding button switch with the edge of the display 16 therebetween). This helps the user to clearly understand correspondences between the button switches (B1 to B7) and the individual guides (Ga1 to Ga7) just by looking.

Figure 6:
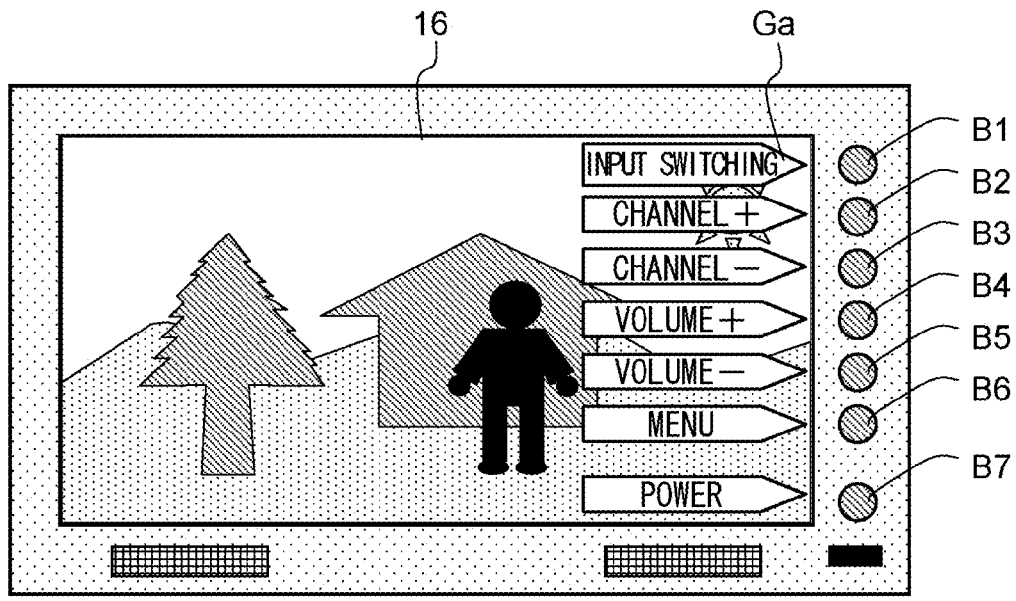
FIG. 6 is a schematic diagram illustrating a state in which the first operation guide is displayed.

FIG. 6 shows the television broadcast receiver 1 with the first operation guide Ga OSD-displayed. Pressing a button switch referring to the first operation guide Ga helps the user to give a correct instruction to the television broadcast receiver 1 without pressing a wrong button switch.

After the operation of step S13 is performed, the control portion 17 monitors whether a non-operation state in which none of the button switches (B1 to B7) is operated has continued for a given period of time (e.g., 10 seconds) (step S14), and also monitors whether any of the button switches (B1 to B7) has been pressed (step S15).

When the non-operation state has continued for the given period of time (Y in step S14), it is judged that the user has no intention to operate for the time being. Then, in this case, the assignment of the instructions to the button switches (B1 to B7) based on the first pattern and the display of the first operation guide Ga are temporarily cancelled (finished) (step S14a), and the operation of step S12 is performed again.

On the other hand, if any of the button switches (B1 to B7) is found to have been pressed (Y in step S15), the control portion 17, judging that the instruction assigned to the pressed button switch has been given, controls each portion such that the operation according to the instruction is performed (step S17).

Here, when the instruction is one to shift the operation mode to the menu mode (that is, when the sixth button B6 is pressed) (Y in step S16), the setting of the operation mode of the television broadcast receiver 1 is updated to the "menu mode". At this time, the assignment of the instructions to the button switches (B1 to B7) based on the first pattern and the display of the first operation guide Ga are cancelled (step S16a).

Then, the television broadcast receiver 1 performs operations of steps S21 to S27, which will be described below, as operations of the menu mode. First, the control portion 17 makes the display 16 OSD-display the menu screen MENU and starts accepting inputs of various settings (step S21). Here, inputs of various settings are continuously accepted as long as the menu mode is set effective.

The menu screen MENU is, as shown in FIG. 7, an OSD display indicating a screen for accepting inputs related to various settings. The menu screen MENU includes "video/audio", "system setting", "location setting", "view/recording programming", and "other settings" entries, and allows the user to selectively choose any of the entries.

And, when the user chooses any of the entries, the menu screen MENU is switched to a screen (not shown) for accepting inputs of settings related to the entry. As a result, for example, when the user intends to make a new setting or update a setting related to the system of the television broadcast receiver 1, he or she is able to do so by choosing the "system setting" entry and then inputting required information according to the screen switched from the menu screen MENU.

And, in a situation in which a later-described operation guide Gb is not displayed (assignment of instructions according to a later-described second pattern has not been carried out yet, either), the control portion 17 stands by to wait for any of the button switches (B1 to B7) to be pressed, which is regarded as an instruction to display a guide (step S22). And, when any of the button switches (B1 to B7) is pressed, that is, when an instruction to display a guide is given (Y in step S22), the control portion 17 assigns instructions according to a second pattern, which is prepared in advance, to the button switches (B1 to B7), and starts the OSD display of the second operation guide Gb shown in FIG. 8 (step S23).

Here, the second pattern is a pattern in which attention is paid to user-friendliness in the menu mode, and in the second pattern, instructions are assigned to the button switches (B1 to B7) in the following manner; that is, the first button B1 is for a "↑" instruction (to move an input cursor or the like upward), the second button B2 is for a "↓" instruction (to move the input cursor or the like downward), the third button B3 is for a "←" instruction (to move the input cursor or the like leftward), the fourth button B4 is for a "→" instruction (to move the input cursor or the like rightward), the fifth button B5 is for an "Enter" instruction (to set the currently selected state or the like to be effective), the sixth button B6 is for a "Return" instruction (to return to, and display, the previous screen), and the seventh button B7 is for a "Power" instruction (to turn the power off).

Further, as shown in FIG. 8, the second operation guide Gb is an OSD display for indicating (informing the user of) what instruction is assigned to each of the buttons (B1 to B7) in a state in which the instructions are assigned based on the second pattern. The second operation guide Gb includes individual guides, namely, a first individual guide Gb1 to a seventh individual guide Gb7, indicating the contents of the instructions assigned to the button switches (B1 to B7), respectively.

Incidentally, an "n"th individual guide corresponds to an "n"th button and indicates the contents of the instruction assigned thereto. And, each of the individual guides (Gb1 to Gb7) is displayed along an edge of the display 16 to form a pair with a corresponding one of the button switches (B1 to B7) (in other words, displayed next to the corresponding button switch with the edge of the display 16 therebetween). This helps the user to clearly understand correspondences between the button switches (B1 to B7) and the individual guides (Gb1 to Gb7) just by looking.

Figure 9:
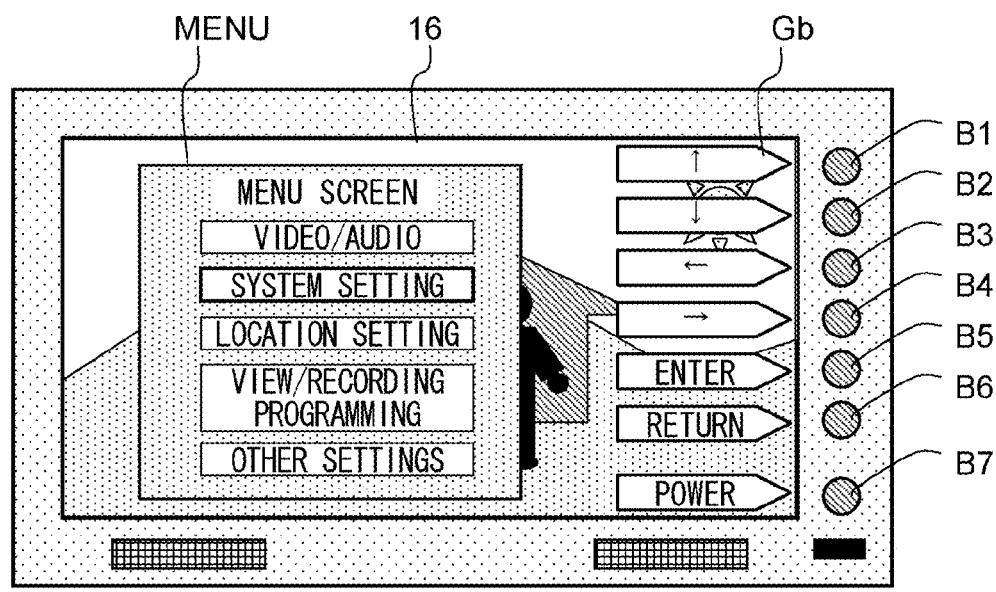
FIG. 9 is a schematic diagram illustrating a state in which the menu screen and the second operation guide are displayed.

FIG. 9 shows the television broadcast receiver 1 with the second operation guide Gb OSD-displayed. Pressing a button switch referring to the first operation guide Gb enables the user to give a correct instruction to the television broadcast receiver 1 without pressing a wrong button switch.

After the operation of step S23 is performed, the control portion 17 monitors whether a non-operation state in which none of the button switches (B1 to B7) is operated has continued for a given period of time (e.g., 10 seconds) (step S24), and also monitors whether any of the button switches (B1 to B7) has been pressed (step S25).

When the non-operation state has continued for the given period of time (Y in step S24), it is judged that the user has no intention to operate the button switches for the time being. Thus, in this case, the assignment of the instructions to the button switches (B1 to B7) based on the second pattern and the display of the second operation guide Gb are cancelled (finished) temporarily (step S24a), and the operation of step S22 is performed again.

On the other hand, when any of the button switches (B1 to B7) has been pressed (Y in step S25), the control portion 17, judging that the instruction assigned to the pressed button has been given, controls each portion such that the operation according to the instruction is performed (step S27).

Here, when the instruction is one to shift the operation mode to the normal mode (Y in step S26), the setting of the operation mode of the television broadcast receiver 1 is updated to the "normal mode". That is, the operation of the television broadcast receiver 1 returns to step S11. At this time, the assignment of the instructions to the button switches (B1 to B7) based on the second pattern and the display of the second operation guide Gb are cancelled (finished), and also, the display of the menu screen MENU is cancelled (step S26a).

As described above, different instructions are assigned to each of the button switches (B1 to B7) in different operation modes (see steps S13 and S23), and separate operation guides (Ga, Gb) are provided to comply with the situations. This enables the television broadcast receiver 1 to appropriately guide the user to what instruction is assigned to each of the button switches (B1 to B7), no matter which operation mode is set effective.

Further, in a situation in which the operation guide (Ga, Gb) is not displayed in each operation mode, the television broadcast receiver 1 displays the operation guide also when any of the button switches (B1 to B7) is pressed. In other words, in a situation in which none of the operation guides (Ga, Gb) is displayed, a guide display instruction (an instruction to display any of the operation guide) is assigned to all the button switches (B1 to B7). This prevents the user from being puzzled about which button switch to press, and thus facilitates the user having any of the operation guides (Ga, Gb) displayed.

Incidentally, in the situation in which none of the operation guides (Ga, Gb) is displayed, the assignment of the instructions to the button switches (B1 to B7) based on the first or second pattern has not been performed yet. This helps minimize the likelihood of the user erroneously pressing any of the button switches (B1 to B7) to give an unintended instruction to the television broadcast receiver 1.

Further, the OSD display of any of the operation guides (Ga, Gb) is temporarily cancelled when the non-operation state has continued for the given period of time. Thus, in contrast to a case in which the operation guides (Ga, Gb) stay displayed without being cancelled, it is possible to enable the television broadcast receiver 1 to minimize the likelihood of an image (an image of a television program, etc.) displayed behind any of the operation guides (Ga, Gb) from being mined.

[Modifications, etc.]

The embodiment of the present invention described hitherto is not meant to limit the present invention. The present invention can be practiced with modifications and alterations within the spirit and scope thereof. Now, descriptions of some modified examples of the present embodiment will be given below.

In the present embodiment, press button switches are adopted as the operation switches (switches operated by the user), but instead, various other types of switches such as lever switches and dial switches may be adopted. Furthermore, as to what instruction to assign to each of the button switches (B1 to B7), it is possible to prepare various patterns, and also, it is possible to display an operation guide according to each of the patterns.

Figure 10:
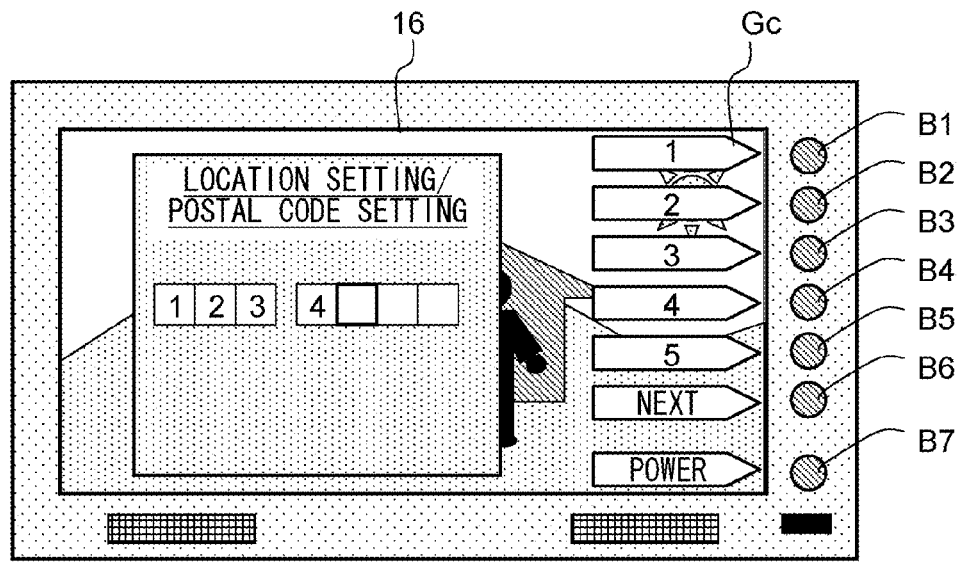
FIG. 10 is a schematic diagram illustrating a state in which another operation guide is displayed.

For example, in the case of a situation in which an input of numbers (such as a postal code) by the user is accepted, instructions to recognize inputs of numbers may be assigned to part of the button switches (B1 to B7). In this case, it is advisable to display an operation guide Gc (that indicates to what number each of the button switches corresponds) as shown in FIG. 10.

Figure 11:
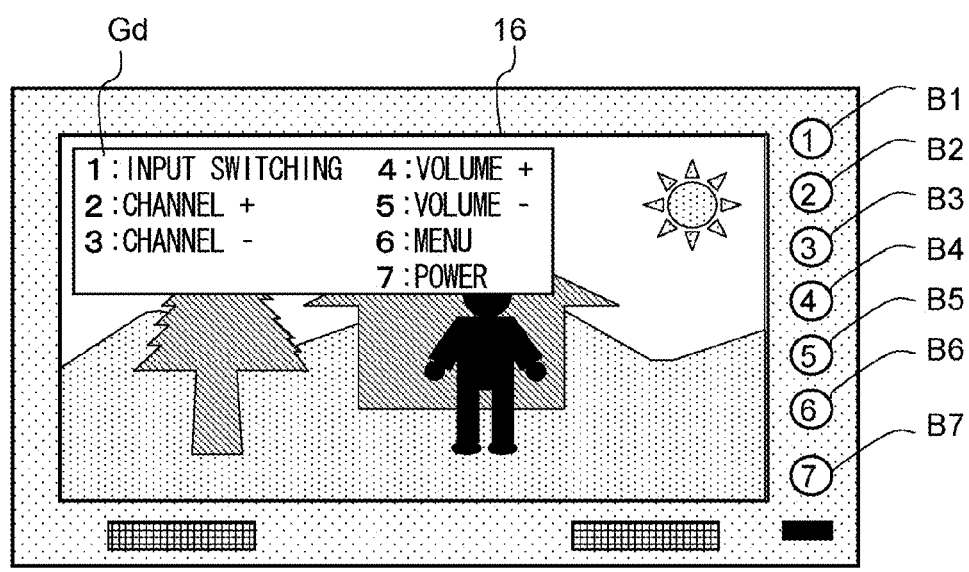
FIG. 11 is a schematic diagram illustrating a state in which still another operation guide is displayed.

The form of the operation guides (Ga, Gb) is not limited to one in which each of the individual guides (Ga1 to Ga7, Gb1 to Gb7) is positioned to form a pair with the corresponding one of the button switches (B1 to B7) as in the present embodiment. For example, each of the button switches (B1 to B7) may have a simple ID (here, any of numbers 1 to 7) written thereon, and there may be displayed an operation guide Gd (in which the IDs are indicated associated with the contents of the corresponding instructions) as shown in FIG. 11.

Also, the instructions may be assigned to the button switches (B1 to B7) in response to switching of the operation mode to be set effective (for example, immediately after the switching is performed). That is, the television broadcast receiver 1 may be structured such that, each time the operation mode to be set effective is switched, the instructions assigned to the button switches (B1 to B7) are updated based on the pattern corresponding to the operation mode that is newly set effective.

In this case, it is preferable that, when any of the button switches (B1 to B7) is pressed with no operation guide (Ga, Gb) displayed, no operation be performed according to the instruction assigned to this one of the button switches (B1 to B7) (that is, the operation that should otherwise be performed in response to the pressing of the button switch is not performed), and that the operation guide (Ga, Gb) start to be displayed. That is, it is only in situations in which an operation guide (Ga, Gb) is displayed that, when any of the button switches (B1 to B7) is operated, operation is performed according to the instruction assigned to the operated one of the button switches (B1 to B7).

This helps minimize the likelihood of the user erroneously pressing the button switches (B1 to B7) to give an unintended instruction to the television broadcast receiver 1. Incidentally, in this embodiment as well, it is possible to cancel the display of the operation guide (Ga, Gb) if a state in which none of the button switches (B1 to B7) is operated has continued for a given period of time.

Figure 12:
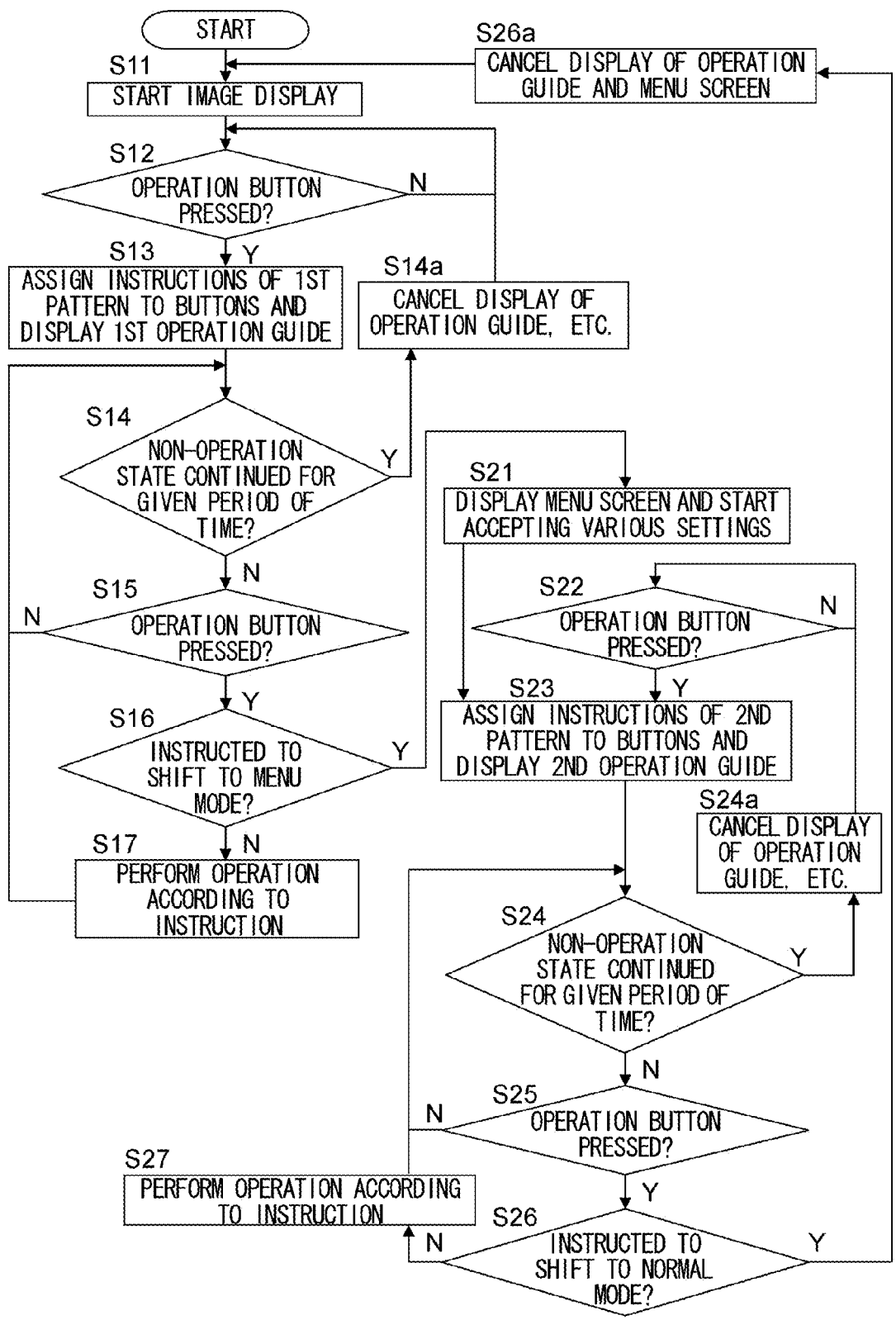
FIG. 12 is a flowchart of a modified example of the main operation that the television broadcast receiver performs.

Further, a description will be given below of a modified example related to the flow (see FIG. 3) of the main operation that the television broadcast receiver 1 performs, with reference to a flow chart shown in FIG. 12. This modified example is different from the present embodiment in the flow of operations in the menu mode. The following description will be focused on differences from the present embodiment, and thus descriptions of features common to the present embodiment may be omitted.

When an instruction to shift to the menu mode is given (Y in step S16), the operation mode setting of the television broadcast receiver 1 is updated to the "menu mode". At this time, the control portion 17 makes the display 16 OSD-display the menu screen MENU, and starts accepting inputs of various settings (step S21). Also, the control portion 17 assigns, to the button switches (B1 to B7), instructions based on the second pattern which is prepared in advance, and starts the OSD display of the second operation guide Gb shown in FIG. 8 (step S23).

After the operation of step S23 is performed, the control portion 17 monitors whether a non-operation state in which none of the button switches (B1 to B7) is operated has continued for a given period of time (step S24), and also monitors whether any of the button switches (B1 to B7) has been pressed (step S25).

Then, when the non-operation state has continued for the given period of time (Y in step S24), the assignment of the instructions to the button switches (B1 to B7) based on the second pattern and the display of the second operation guide Gb are temporarily cancelled (finished) (step S24a), and the control portion 17 stands by to wait for any of the button switches (B1 to B7) to be pressed, which is regarded as an instruction to display a guide (step S22). And, when any of the button switches (B1 to B7) is pressed, that is, the instruction to display a guide is given (Y in step S22), the operation of step S23 is performed again. Incidentally, the operation performed when any of the button switches (B1 to B7) is pressed (Y in step S25) is the same as in the present embodiment.

[Others]

As described above, the television broadcast receiver 1 includes: the display 16; a functional portion (the operation mode setting portion) which switchably sets any of a plurality of prepared operation modes to be effective; the plurality of operation switches (B1 to B7) (operation switches) to each of which different instructions are assigned according to patterns (the first pattern and the second pattern) prepared for the operation modes on a one-to-one basis; and a functional portion (the guide display portion) which displays, on the display, an operation guide (Ga, Gb) indicating what instruction is assigned to each of the button switches (B1 to B7).

Furthermore, the television broadcast receiver 1 operates corresponding to an operation mode which is currently set effective, and also, when any of the button switches (B1 to B7) is pressed, the television broadcast receiver 1 operates according to an instruction assigned to this one of the button switches (B1 to B7) which is pressed. And, the guide display portion is provided with first and second operation guides Ga and Gb corresponding to the first and second patterns, respectively, and displays either of the operation guides that corresponds to the pattern that is currently used to assign instructions to the button switches (B1 to B7).

This enables the television broadcast receiver 1, which is provided with the operation switches to which different patterns of instructions are assigned in different operation modes, to appropriately display the operation guides. According to a display device of the present invention, a plurality of operation guides are prepared corresponding to patterns prepared for operation modes, and an operation guide corresponding to a pattern that is currently used to assign instructions to operation switches is displayed. This enables the display device, which is provided with the operation switches to which instructions of different patterns are assigned in different operation modes, to appropriately display the operation guides.

What is claimed is:

1. A display device, comprising:
a display;
an operation mode setting portion which switchably sets any of a plurality of prepared operation modes to be effective;
a plurality of operation switches to each of which different instructions are assigned based on patterns which are prepared corresponding to the operation modes on a one-to-one basis; and
a guide display portion which displays, on the display, an operation guide indicating what instruction is assigned to each of the operation switches,
wherein
the display device operates according to an operation mode which is currently set effective, the display device operating in compliance with instructions assigned to the operation switches when the operation switches are operated; and
the guide display portion has a plurality of kinds of operation guides which are prepared as the operation guide and which correspond to the patterns on a one-to-one basis, the guide display portion displaying any of the operation guides corresponding to any of the patterns that is currently used for assigning instructions to the operation switches.

2. The display device of claim 1,
wherein,
each time the operation mode which is set effective is switched, instructions assigned to the operation switches are updated based on any of the patterns which corresponds to the operation mode which is newly set effective; and
when any of the operation switches is operated in a situation in which the operation guide is not displayed,
no operation according to an instruction assigned to the operation switch is performed, and
the guide display portion starts displaying the operation guide.

3. The display device of claim 2,
wherein,
when the operation guide is displayed, the guide display portion finishes displaying the operation guide when a state in which none of the operation switches is operated continues for a given period of time.

4. The display device of claim 1,
wherein, when the operation guide is not displayed, the display device stands by to wait for an operation to be performed on any of the operation switches as a guide display instruction; and when the guide display instruction is given,
an instruction based on any of the patterns is assigned to each of the operation switches, and
the guide display portion starts displaying the operation guide.

5. The display device of claim 4,
wherein,
when the operation guide is displayed, the guide display portion finishes displaying the operation guide when a state in which none of the operation switches is operated continues for a given period of time.

6. The display device of claim 1,
wherein
the operation switches are arranged along an edge of the display;
the operation guide includes individual guides corresponding to the operation switches on a one-to-one basis, each of the individual guides indicating what instruction is assigned to a corresponding one of the operation switches; and
each of the individual guides is displayed along the edge of the display to form a pair with the corresponding one of the operation switches.

7. The display device of claim 1,
wherein
the display device makes the display display an image based on obtained image information;
the operation switches are press button switches; and
the guide display portion makes the display OSD-display the operation guide such that the operation guide is superimposed on the image.

8. The display device of claim 7,
wherein the display device is a television broadcast receiver that obtains the image information by receiving television broadcast.

9. The display device of claim 8,
wherein
each time the operation mode which is set effective is switched, instructions assigned to the operation switches are updated based on any of the patterns which corresponds to the operation mode which is newly set effective;

when any of the operation switches is operated in a situation in which the operation guide is not displayed, no operation according to an instruction assigned to the operation switch is performed, and the guide display portion starts displaying the operation guide;

when a state in which none of the operation switches is operated continues for a given period of time while the operation guide is displayed, the guide display portion finishes displaying the operation guide;

the operation switches are arranged along an edge of the display;

the operation guide includes individual guides corresponding to the operation switches on a one-to-one basis, each of the individual guides indicating what instruction is assigned to a corresponding one of the operation switches; and each of the individual guides is displayed along the edge of the display to form a pair with the corresponding one of the operation switches.

10. The display device of claim 8,
wherein
when the operation guide is not displayed, the display device stands by to wait for an operation to be performed on any of the operation switches as a guide display instruction;

when the guide display instruction is given, an instruction based on any of the patterns is assigned to each of the operation switches, and the guide display portion starts displaying the operation guide;

when the operation guide is displayed, the guide display portion finishes displaying the operation guide when a state in which none of the operation switches is operated continues for a given period time;

the operation switches are arranged along an edge of the display;

the operation guide includes individual guides corresponding to the operation switches on a one-to-one basis, each of the individual guides indicating what instruction is assigned to a corresponding one of the operation switches; and each of the individual guides is displayed along the edge of the display to form a pair with the corresponding one of the operation switches.

* * * * *